(12) United States Patent
Kim et al.

(10) Patent No.: US 9,382,731 B2
(45) Date of Patent: Jul. 5, 2016

(54) ACTIVE HOOD LATCH APPARATUS FOR VEHICLE

(71) Applicants: Hyundai Motor Company, Seoul (KR); Kia Motors Corporation, Seoul (KR); PYEONG HWA AUTOMOTIVE CO., LTD., Daegu (KR)

(72) Inventors: Sang Il Kim, Seoul (KR); Seong Tae Hong, Suwon-si (KR)

(73) Assignees: Hyundai Motor Company, Seoul (KR); Kia Motors Corporation, Seoul (KR); PYEONG HWA AUTOMOTIVE CO., LTD., Daegu (KR)

( * ) Notice: Subject to any disclaimer, the term of this patent is extended or adjusted under 35 U.S.C. 154(b) by 126 days.

(21) Appl. No.: 14/102,968

(22) Filed: Dec. 11, 2013

(65) Prior Publication Data

US 2015/0102607 A1 Apr. 16, 2015

(30) Foreign Application Priority Data

Oct. 10, 2013 (KR) ........................ 10-2013-0120289

(51) Int. Cl.
*E05C 3/06* (2006.01)
*E05B 77/08* (2014.01)
(Continued)

(52) U.S. Cl.
CPC ................ *E05B 77/08* (2013.01); *B62D 25/12* (2013.01); *E05B 77/54* (2013.01); *E05B 83/16* (2013.01); *E05B 83/24* (2013.01); *E05B 83/243* (2013.01); *Y10T 292/0908* (2015.04)

(58) Field of Classification Search
CPC ....... E05B 51/02; E05B 51/023; E05B 77/02; E05B 77/08; E05B 77/10; E05B 77/54; E05B 83/16; E05B 83/24; E05B 83/243; B60R 21/34; B60R 21/38; B62D 25/10; B62D 25/12
USPC ........... 292/95, 116, 121, 117, 122, 125, 127, 292/119, 96, 99, 102, 92, 201, 216, 292/DIG. 14, DIG. 23, DIG. 65, 194, 213, 292/214, 219, 220, 225, 227, 228, 195, 198, 292/202–204, 341.15–341.17; 70/92; 296/187.09, 187.04; 180/274
See application file for complete search history.

(56) References Cited

U.S. PATENT DOCUMENTS 6,422,616 B1 * 7/2002 Wortmann et al. ........... 292/216
8,584,787 B2 * 11/2013 Hwang .......................... 180/274
(Continued)

FOREIGN PATENT DOCUMENTS

DE 102005060750 A1 * 6/2007
DE 102006012090 A1 * 10/2007
(Continued)

OTHER PUBLICATIONS

Computer-Generated Translation for DE 102007021840, http://search.proquest.com, Translation generated on Jun. 27, 2015.*

*Primary Examiner* — Alyson M Merlino
(74) *Attorney, Agent, or Firm* — Morgan, Lewis & Bockius LLP

(57) ABSTRACT

An active hood latch apparatus for a vehicle includes a latch for locking or unlocking a striker connected to a hood; a base panel installed such that the latch can be rotated; a lever member rotatably installed in the base panel, the striker locked by the latch being located in a rotational path thereof; a locking part rotatably installed in the base panel to restrain movement of a guide pin, and to release the restraint of the guide pin in conjunction with the rotation of the lever member; and a driving part rotating the lever member by a force larger than a restraint force of the locking part that restrain the guide pin, to supply power to raise the striker, and then absorbing an impact.

7 Claims, 14 Drawing Sheets

(51) Int. Cl.
*B62D 25/12* (2006.01)
*E05B 77/54* (2014.01)
*E05B 83/16* (2014.01)
*E05B 83/24* (2014.01)
*E05C 3/16* (2006.01)

(56) References Cited

U.S. PATENT DOCUMENTS

2013/0033069 A1* 2/2013 Hwang .................. B60R 21/38 296/187.04
2013/0300134 A1* 11/2013 Jayasuriya et al. ........... 292/129
2015/0054293 A1* 2/2015 Kim et al. ....................... 292/92
2015/0107927 A1* 4/2015 Kim ....................... B60R 21/38 180/274

FOREIGN PATENT DOCUMENTS

| | | | |
|---|---|---|---|
| DE | 102007021840 A1 | * | 11/2008 |
| DE | 102011076770 A1 | * | 12/2012 |
| DE | 102012009414 A1 | * | 11/2013 |
| EP | 2096007 A1 | * | 9/2009 |
| JP | 2005-163535 A | | 6/2005 |
| JP | 2009-236313 A | | 10/2009 |
| KR | 1998-078001 A | | 11/1998 |
| KR | 10-1091518 B1 | | 12/2011 |
| KR | 10-1293974 B1 | | 8/2013 |
| WO | WO 2013082711 A1 | * | 6/2013 ............. B62D 25/10 |

* cited by examiner

ACTIVE HOOD LATCH APPARATUS FOR VEHICLE

CROSS-REFERENCE TO RELATED APPLICATION

The present application claims priority of Korean Patent Application Number 10-2013-0120289 filed Oct. 10, 2013, the entire contents of which application is incorporated herein for all purposes by this reference.

BACKGROUND OF INVENTION

1. Field of Invention

The present invention relates to an active hood latch apparatus for a vehicle. More particularly, the present invention relates to an active hood latch apparatus for a vehicle which moves a hood upward when a collision with a pedestrian occurs, so that a secondary impact applied to the pedestrian can be reduced.

2. Description of Related Art

In general, an engine room is provided at a front side of a passenger vehicle among vehicles, and the engine room is shielded by a hood.

Since a layout of the engine room is designed such that components such as an engine, etc. are compactly disposed, clearance to absorb an impact is not provided, and the hood is designed to have a substantially strong structure so as to reliably shield the engine room.

Therefore, when a collision with a pedestrian occurs, the pedestrian directly collides with a front bumper of a vehicle, and then a head of the pedestrian secondarily collides with a hood of a vehicle while falling toward the hood, so that the pedestrian is heavily damaged.

In recent years, an active hood system in which, when a collision with a pedestrian occurs, a hood functions to absorb an impact so as to absorb impact energy of the pedestrian has been applied.

The related art of the present invention is disclosed in Korean Patent No. 10-077518 (issued on Nov. 2, 2007, where the title of the invention is a hood structure for enhancing a performance of an active hood system of a vehicle).

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for an active hood latch apparatus for a vehicle, which moves a hood upward when a collision with a pedestrian occurs, thereby reducing a secondary impact of the pedestrian.

In accordance with an aspect of the present invention, there is provided an active hood latch apparatus for a vehicle including a latch for locking or unlocking a striker connected to a hood; a base panel installed such that the latch can be rotated; a lever member rotatably installed in the base panel, the striker locked by the latch being located in a rotational path thereof; a locking part rotatably installed in the base panel to restrain movement of a guide pin, and to release the restraint of the guide pin in conjunction with the rotation of the lever member; and a driving part rotating the lever member by a force larger than a restraint force of the locking part that restrain the guide pin, to supply power to raise the striker, and then absorbing an impact, wherein, when the striker pushed and raised by the lever member is lowered, the locking part restrains the lever member from being rotated such that the lever member does not rotated in a return direction.

In accordance with another aspect of the present invention, there is provided the active hood latch apparatus for a vehicle further including a power transmission member for transmitting power of the driving part to the lever member.

In accordance with another aspect of the present invention, when an external force applied to the lever member is larger than a restraint force of the locking part that restrains the rotation of the lever member, the lever member is rotated in a return direction while pushing the locking part so as to move the striker downward.

In accordance with another aspect of the present invention, there is provided the active hood latch apparatus for a vehicle, wherein the latch includes: a restraint portion for restraining the movement of the striker; a locking portion connected to a cable member, for controlling rotation of the restraint portion; and a mounting panel rotatably mounted to the restraint portion and the locking portion, and having a guide recess into which the striker is inserted between the restraint portion and the locking portion.

In accordance with another aspect of the present invention, there is provided the active hood latch apparatus for a vehicle, wherein the locking portion includes: a locking body rotatably installed on movement path of the guide pin and rotated by the movement of the lever member; a locking connection shaft passing through the locking body and connected to the base panel; and a locking spring wound on the outside of the locking connection shaft, for disposing the locking body on the movement path of the guide pin through pressing a locking boss extending from the locking body by a resilient force.

In accordance with another aspect of the present invention, there is provided the active hood latch apparatus for a vehicle, wherein the driving part includes: a driving housing fixed to a case part, one of the driving housing being opened; an explosion portion located inside the driving housing and exploded by an external signal; a piston installed inside the driving housing to be linearly moved and moved by the explosion of the explosion portion; and a rod member connected to the piston, for pressing the power transmission member by movement of the piston.

In accordance with another aspect of the present invention, there is provided the active hood latch apparatus for a vehicle, wherein the driving part has a ring shape enclosing the outside of the piston, and further includes a melt sealing melted by gas generated by the explosion of the explosion portion to allow the gas to be discharged between the driving housing and the piston.

In accordance with another aspect of the present invention, there is provided the active hood latch apparatus for a vehicle, wherein the power transmission member includes: a power transmission body rotatably installed in the base panel; an extension member extending from the power transmission body and facing the rod member; and a press boss extending from the power transmission body and facing a side surface of the lever member.

An active hood latch apparatus for a vehicle according to the present invention moves a striker upward by rotating a lever member by using an explosion of a driving part when a collision with a pedestrian occurs, thereby reducing a secondary impact of the pedestrian.

Further, in accordance with the present invention, since high temperature gas can be moved toward the outside of a piston through melting melt-sealing by the gas in a state where a hood is moved upward by unfolding of a rod member, a hood is moved downward when a pedestrian collides with the hood, to absorb an impact caused by the collision, so as to reduce a secondary impact of the pedestrian.

Further, in accordance with the present invention, a hood can be completely closed after a collision with a pedestrian so that noise, vibration, and safety problem generated when a vehicle is moved can be solved and foreign substances can be prevented from being introduced into the vehicle The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 15 is a block diagram showing an active hood latch apparatus for a vehicle according to the present invention.

Figure 1:
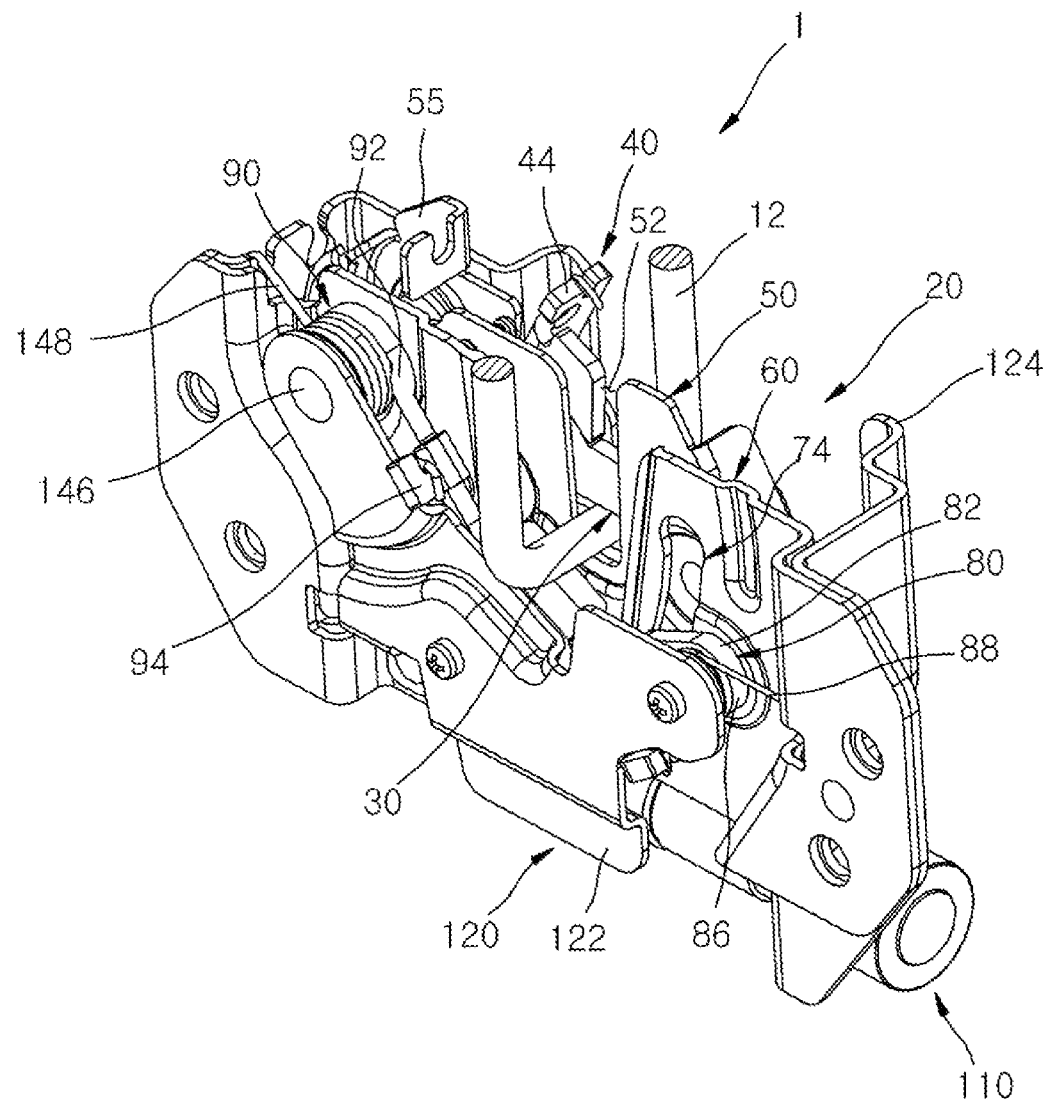
FIG. 1 is a perspective view schematically showing an exemplary active hood latch apparatus for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In this process, the thickness of the lines and the sizes of the constituent elements illustrated in the drawings may be illustrated to be exaggerated for clarity and convenience. The terms described below are terms defined in consideration of the functions in the present invention, and may be different according to the intentions or customs of a user or a manager. Thus, the terms should be defined based on the overall contents of the specification.

Figure 2:
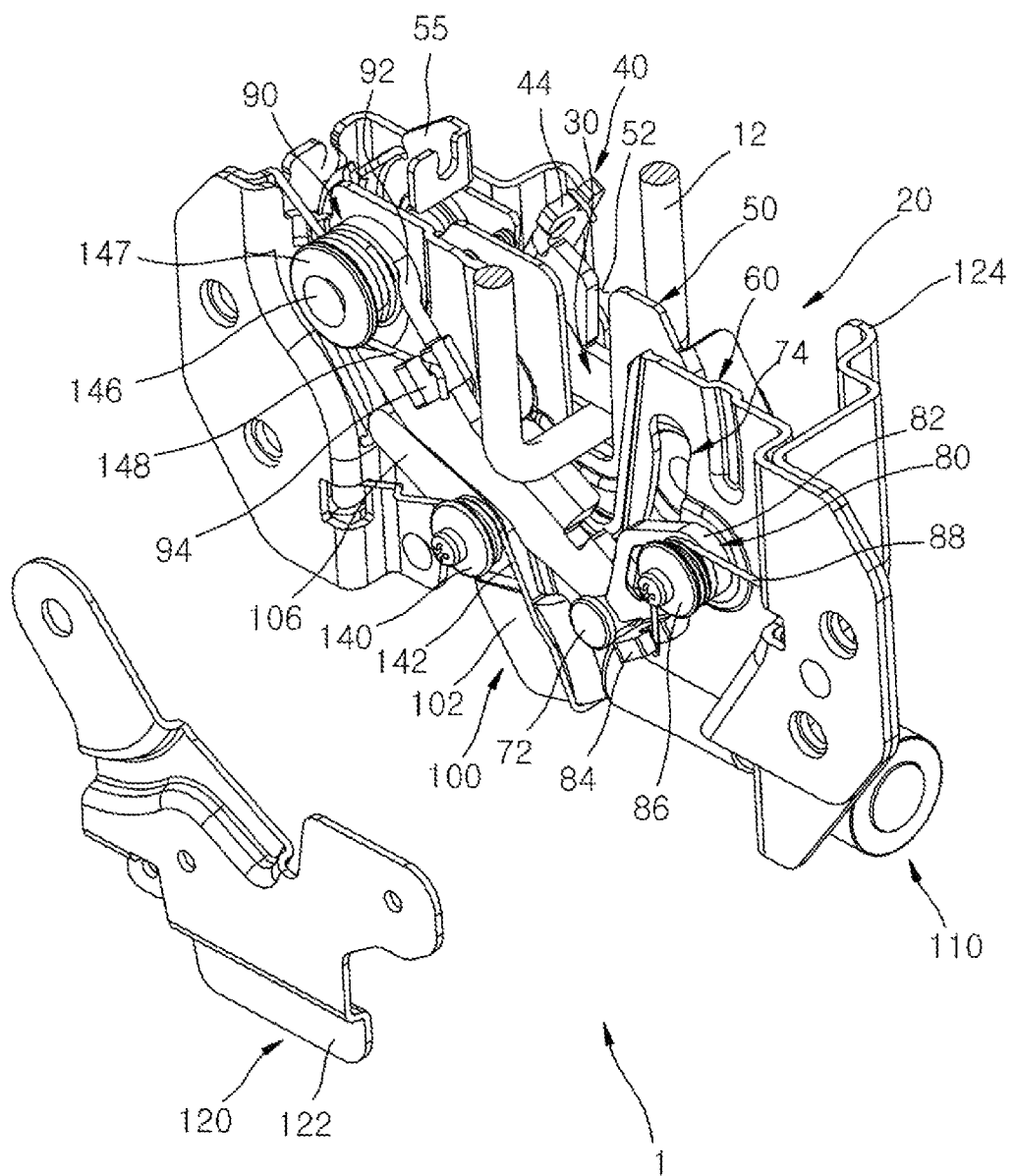
FIG. 2 is a perspective view schematically showing a state where a first panel is separated from an active hood latch apparatus for a vehicle according to the present invention.
Figure 3:
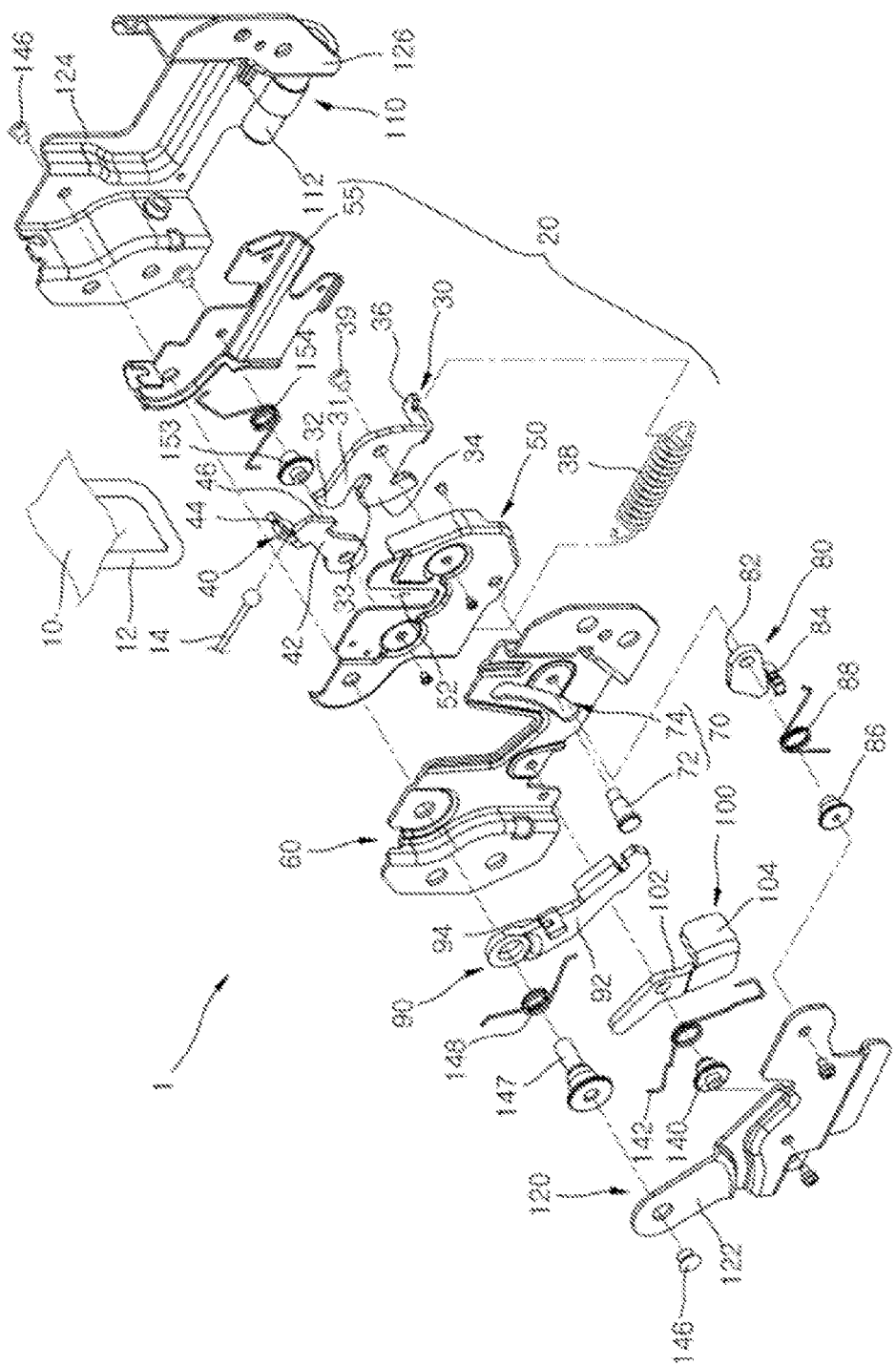
FIG. 3 is an exploded perspective view schematically showing an active hood latch apparatus for a vehicle according to the present invention.
Figure 4:
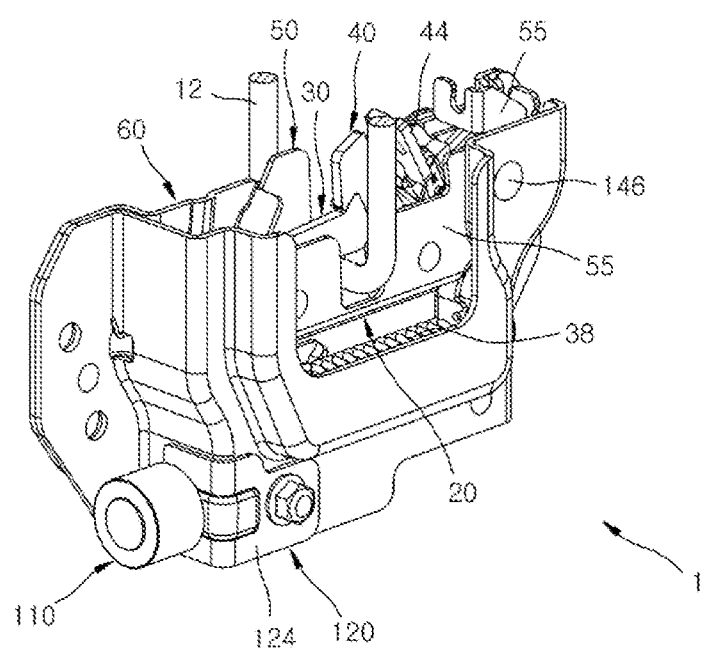
FIG. 4 is a perspective view schematically showing a state where a second panel according to the present invention is installed.
Figure 5:
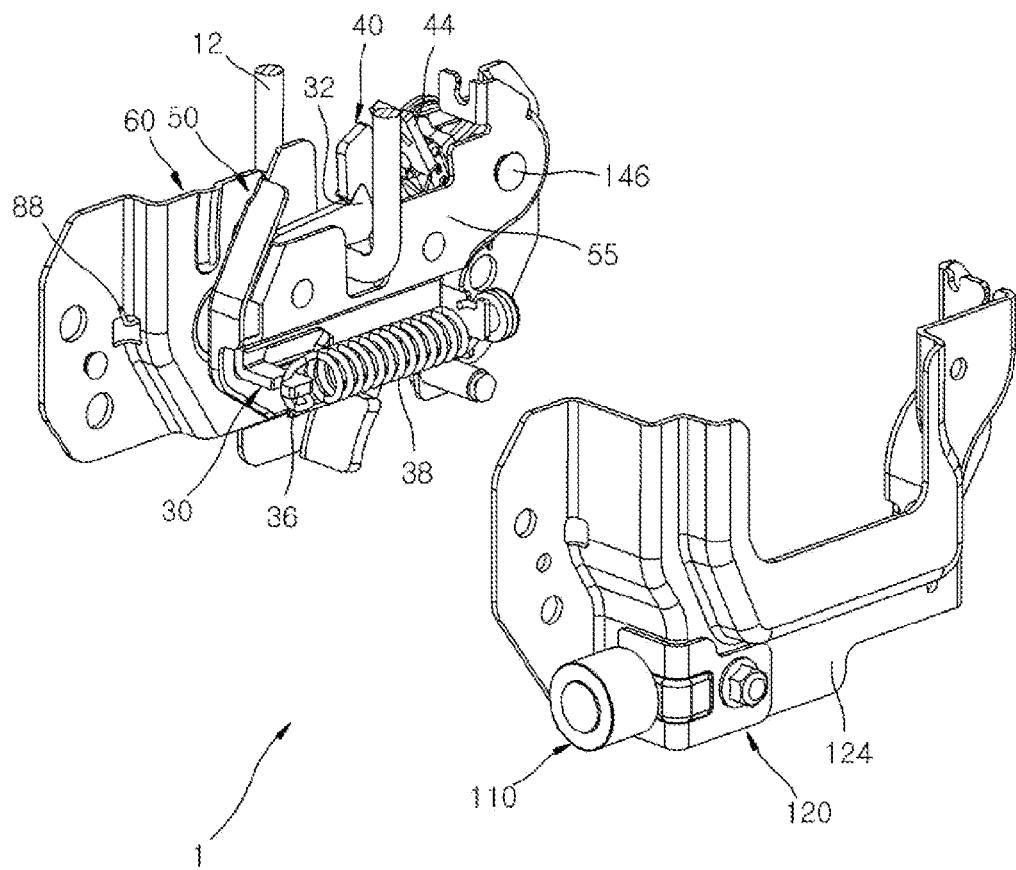
FIG. 5 is a perspective view schematically showing a state where a second panel is separated from an active hood latch apparatus for a vehicle according to the present invention.
Figure 6:
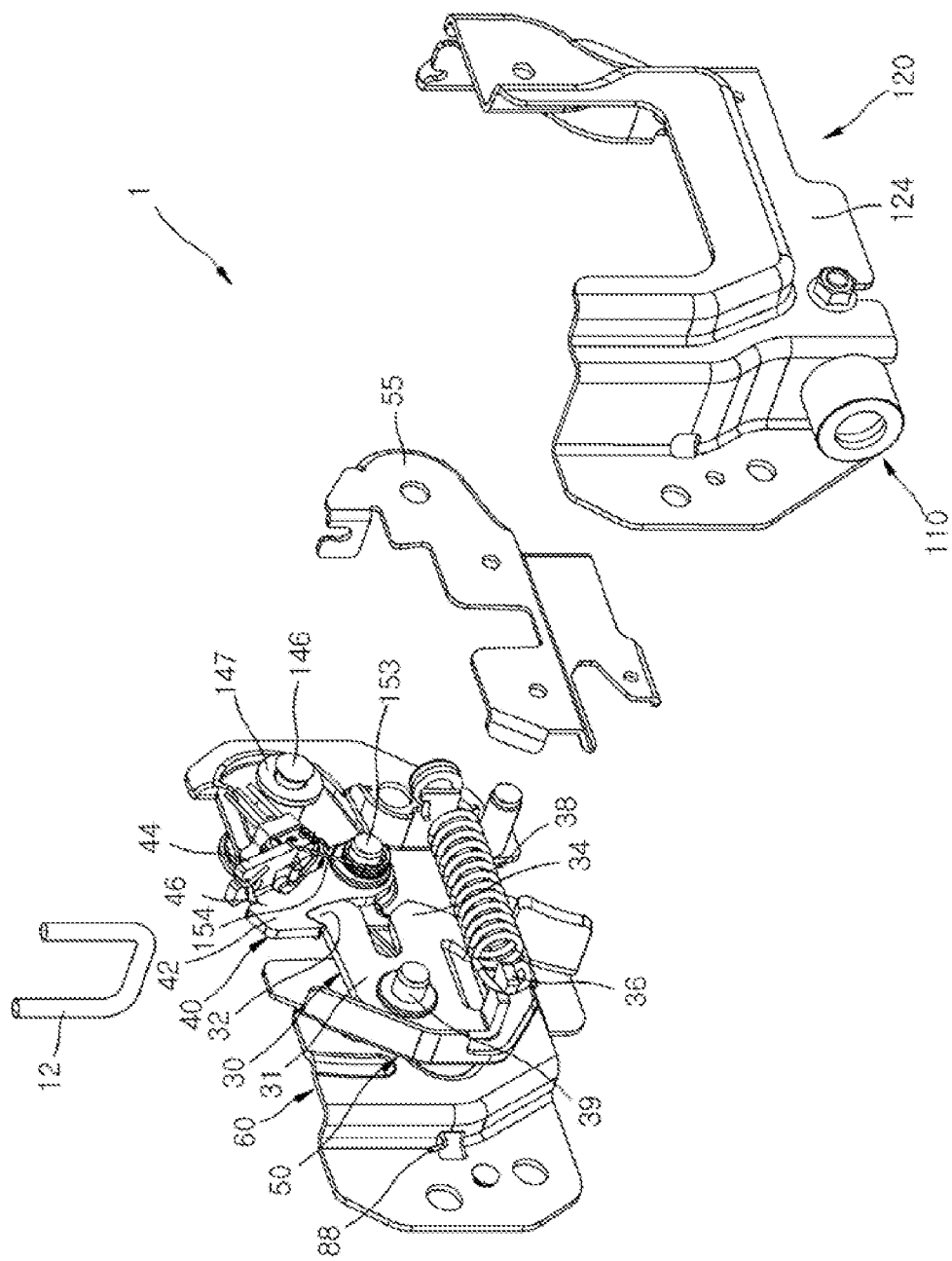
FIG. 6 is a perspective view schematically showing a state where a latch according to the present invention is installed.
Figure 7:
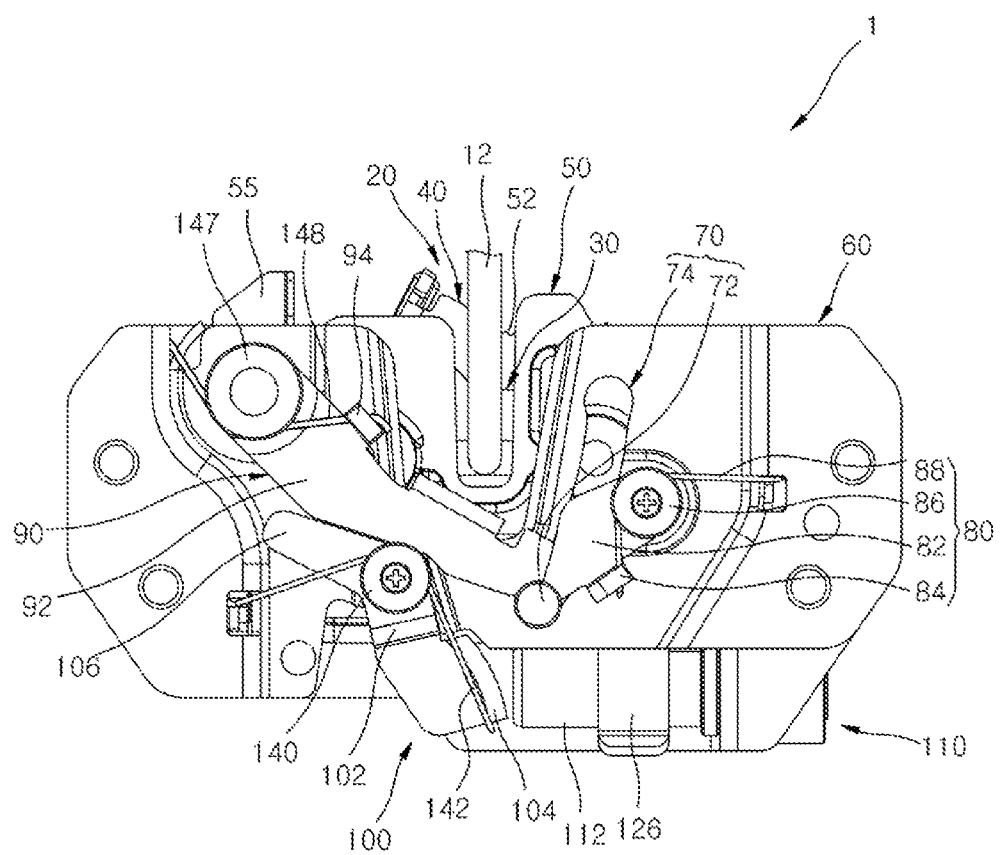
FIG. 7 is a front view schematically showing a state before a driving part according to the present invention is operated.
Figure 8:
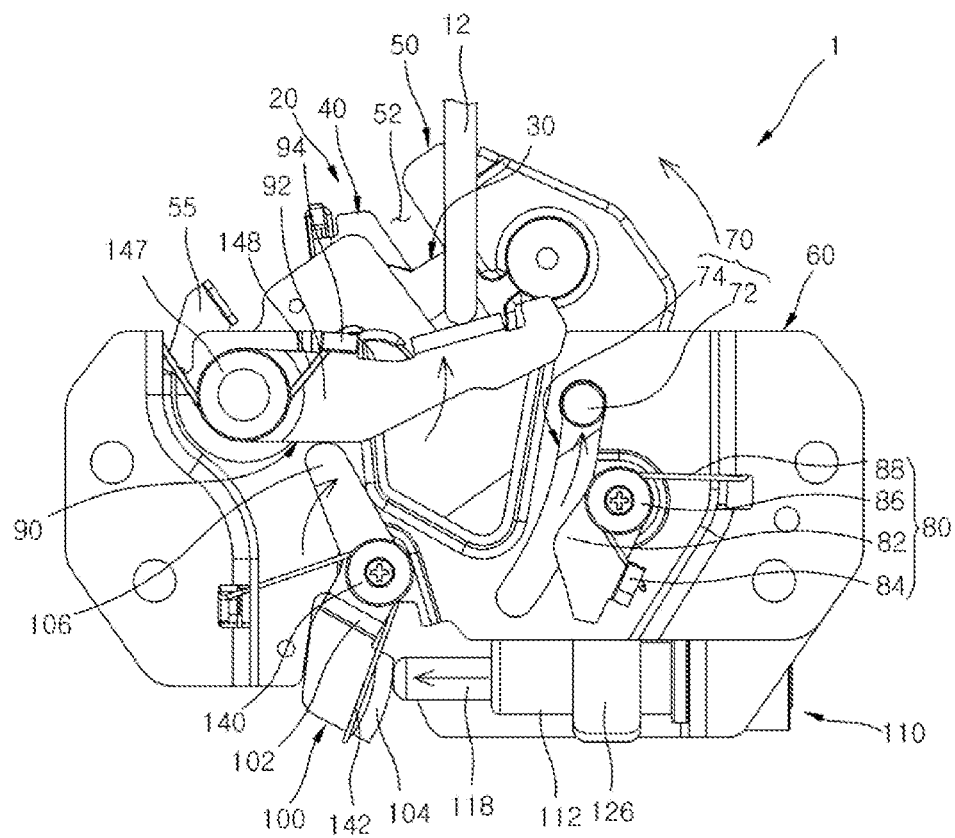
FIG. 8 is a front view schematically showing a state where a striker is raised by rotating a lever member by an operation of a driving part according to the present invention.
Figure 9:
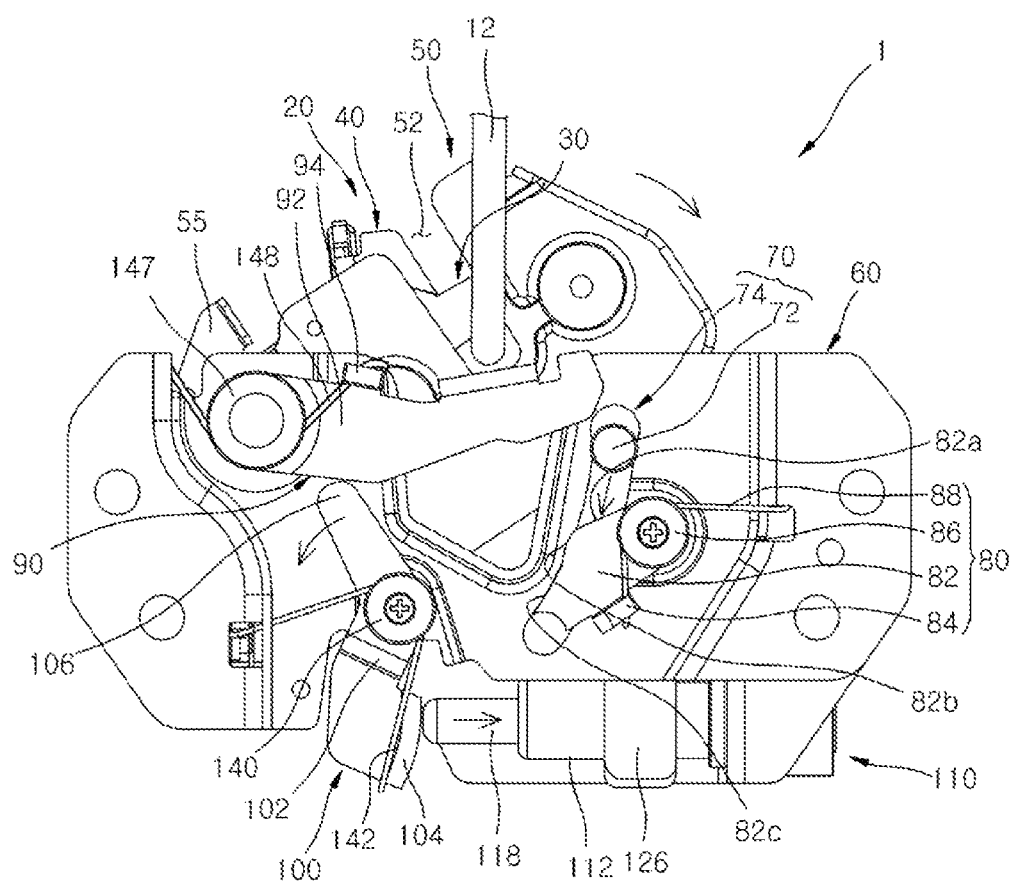
FIG. 9 is a front view schematically showing a state where a striker is moved downward by melting a melt-sealing of a driving part according to the present invention so as to perform absorbing of an impact.
Figure 10:
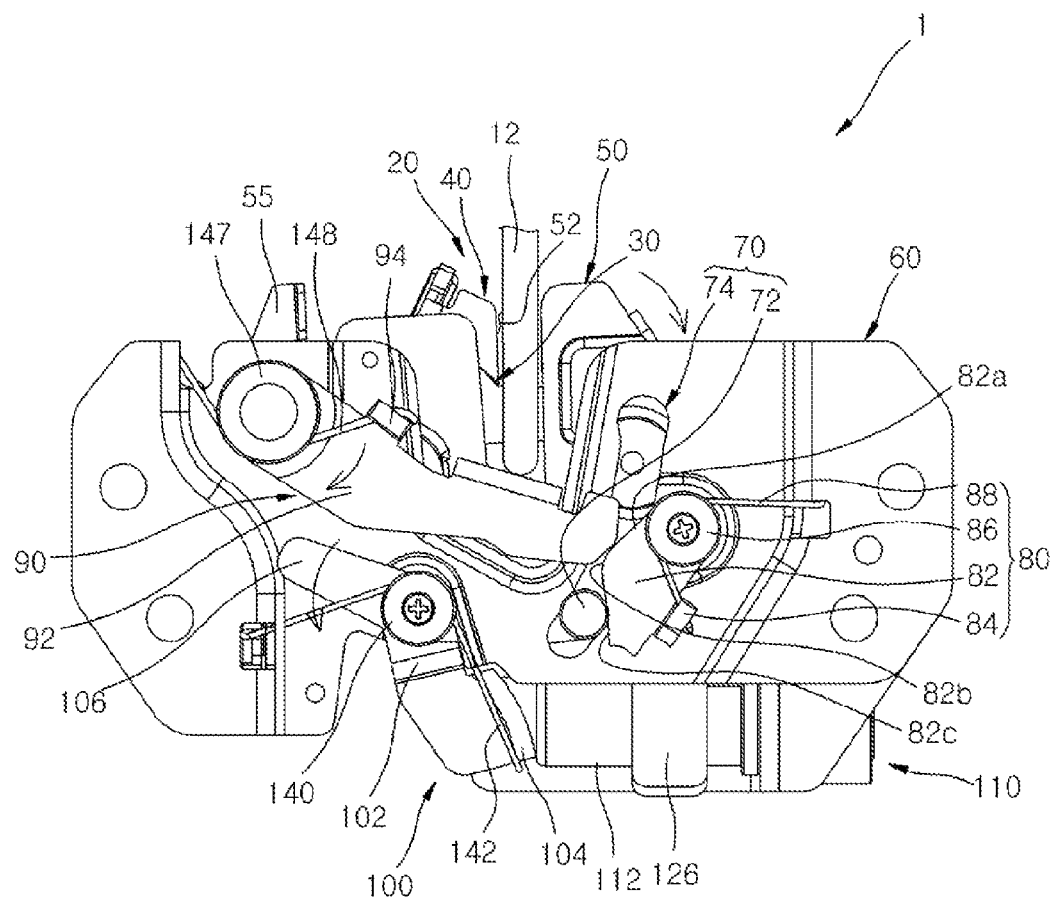
FIG. 10 is a front view schematically showing a state where gas in a driving part according to the present invention is completely discharged.
Figure 11:
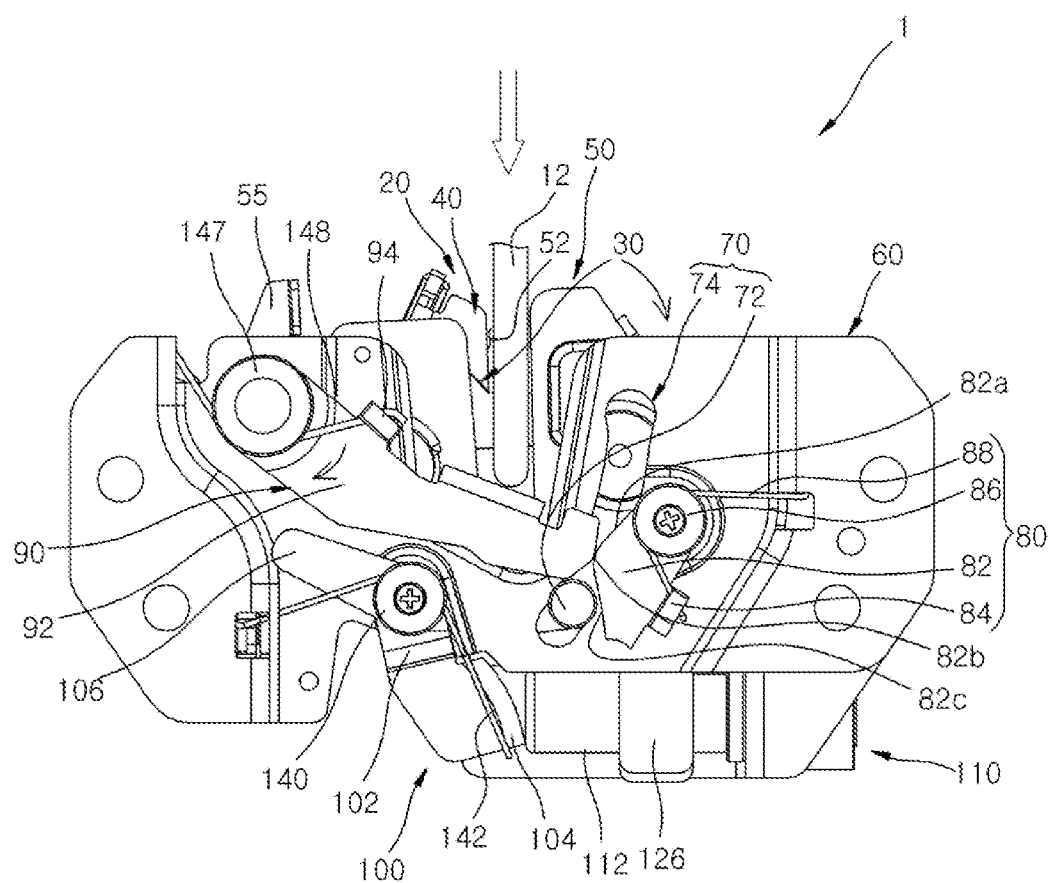
FIG. 11 is a front view schematically showing a state where a hood according to the present invention is pressed downward.
Figure 12:
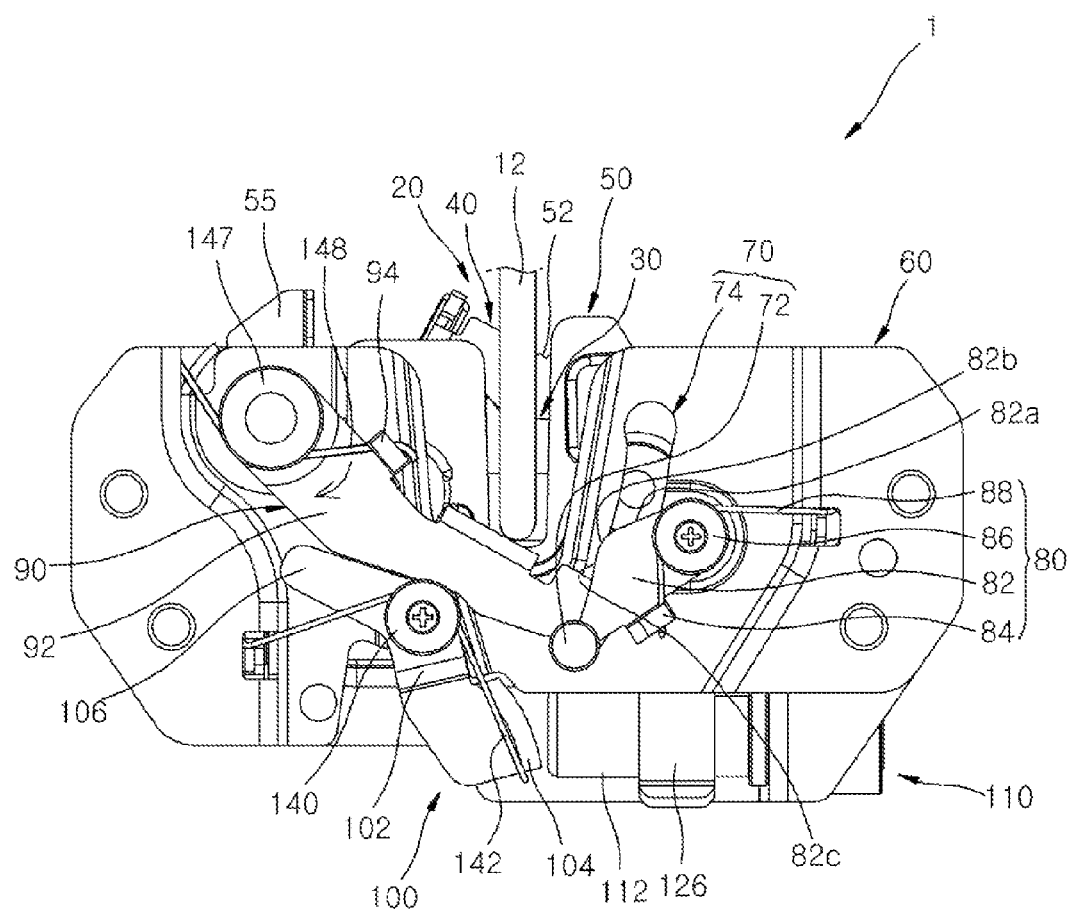
FIG. 12 is a front view schematically showing a state a guide pin according to the present invention is locked by a locking body.
Figure 13:
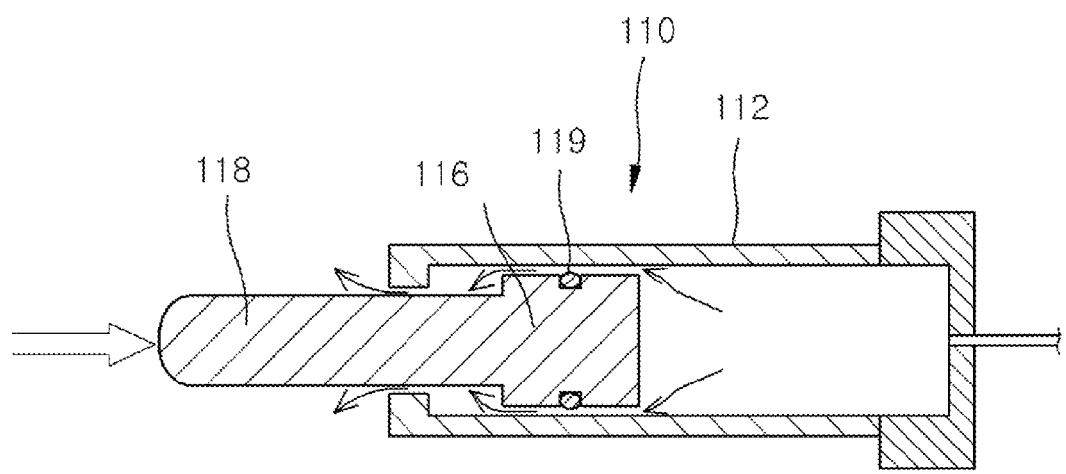
FIG. 13 is a sectional view schematically showing a driving part according to the present invention.
Figure 14:
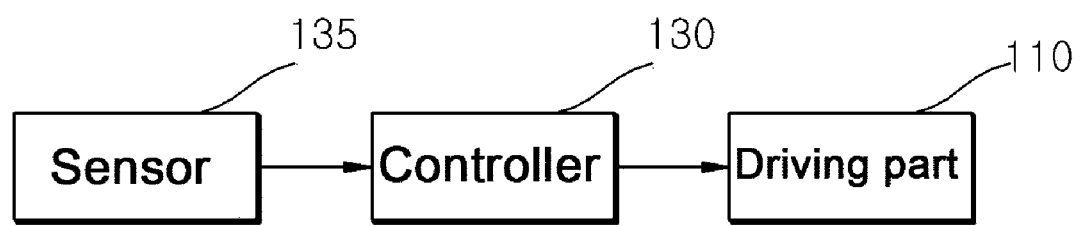
FIG. 14 is a sectional view schematically showing a state where gas in a driving part according to the present invention is discharged.

FIG. 1 is a perspective view schematically showing an active hood latch apparatus for a vehicle according to various embodiments of the present invention. FIG. 2 is a perspective view schematically showing a state where a first panel is separated from an active hood latch apparatus for a vehicle according to various embodiments of the present invention. FIG. 3 is an exploded perspective view schematically showing an active hood latch apparatus for a vehicle according to various embodiments of the present invention. FIG. 4 is a perspective view schematically showing a state where a second panel according to various embodiments of the present invention is installed. FIG. 5 is a perspective view schematically showing a state where a second panel is separated from an active hood latch apparatus for a vehicle according to various embodiments of the present invention. FIG. 6 is a perspective view schematically showing a state where a latch according to various embodiments of the present invention is installed. FIG. 7 is a front view schematically showing a state before a driving part according to various embodiments of the present invention is operated. FIG. 8 is a front view schematically showing a state where a striker is raised by rotating a lever member by an operation of a driving part according to various embodiments of the present invention. FIG. 9 is a front view schematically showing a state where a striker is moved downward by melting a melt-sealing of a driving part according to various embodiments of the present invention so as to perform absorbing of an impact. FIG. 10 is a front view schematically showing a state where gas in a driving part according to various embodiments of the present invention is completely discharged. FIG. 11 is a front view schematically showing a state where a hood according to various embodiments of the present invention is pressed downward. FIG. 12 is a front view schematically showing a state a guide pin according to various embodiments of the present invention is locked by a locking body. FIG. 13 is a sectional view schematically showing a driving part according to various embodiments of the present invention. FIG. 14 is a sectional view schematically showing a state where gas in a driving part according to various embodiments of the present invention is discharged. FIG. 15 is a block diagram showing an active hood latch apparatus for a vehicle according to various embodiments of the present invention.

As shown in FIGS. 1 to 7 and FIG. 15, an active hood latch apparatus 1 for a vehicle according to various embodiments of the present invention includes a latch 20 for locking or unlocking a striker connected to a hood 10, a base panel 60 installed such that the latch 20 can be rotated, a guide pin 72 extending from the latch 20 and protruding toward the outside of the base panel 60, a guide hole 74 forming a hole at the base panel 60 along a movement path of the guide pin 72, a lever member 90 where the locked striker 12 at the latch 20 is located in a rotational path of the lever member, a locking part 80 rotatably installed in the base panel 60, for restraining movement of the guide pin 72 and releasing the restraint of the guide pin 72 by interlocking with the rotation of the lever member, and a driving part 110 for rotating the lever member 90 by a force more than a restraint force of the locking part 80 restraining the guide pin 72 to supply power raising the striker 12 so as to absorb an impact. The guide pin 72 moving with the latch 20 is caught by the locking part 80 by lowering the striker 12 pushed and raised by the lever member 90 so that the movement of the guide pin 72 is restrained.

The striker 12 is installed at a lower side of the hood rotatably installed at an upper side of an engine room.

The striker 12 is curved to have a U-shape, and moves upward and downward with the hood 10.

The latch 20 rotatably installed in a case part 120 may be formed in various shape without departing from technical spirits which lock and unlock the striker 12 connected to the hood 10.

The latch 20 according to various embodiments of the present invention includes a restraint portion 30 for restraining the movement of the striker 12, a locking portion 40 connected to a cable member 14, for controlling the rotation of the restraint portion 30, a mounting panel 50 having a guide recess 52 into which the striker 12 is inserted between the restraint portion 30 and the locking portion 40, the restraint portion 30 and the locking portion 40 being rotatably mounted to the mounting panel 50.

The restraint portion 30 for restraining the movement of the striker 12 includes a restraint body 31, a first boss 32, a leading-in recess 33, a second boss 34, a mounting boss 36, a resilient member 38, and a mounting pin 39.

The restraint body 31 forming a body of the restraint portion 30 has a plate-shape and is rotatably mounted to the mounting panel 50.

The first boss 32 and the second boss 34 protrude toward one side of the restraint body 31, and the leading-in recess 33 into which the striker 12 is inserted is provided between the first boss 32 and the second boss 34.

The mounting pin 39 is installed to pass through the restraint body 31 and the mounting panel 50 so that the restraint body 31 is rotatably installed about the mounting pin 39.

The mounting boss 36 is provided at a lower side of the mounting body 31. One side of the resilient member 38 employing a coil spring is caught by the mounting boss 36, and the other side of the resilient member 38 is caught by the mounting panel 50.

The resilient member 38 is installed in a horizontal direction (hereinafter, with reference to FIG. 6), the restraint body 31 is rotated by a resilient force of the resilient member 38 in a counterclockwise direction, and a rotational angle is adjusted by being spaced apart from or contacting the locking portion 40 pushed by the cable member 14.

The locking portion 40 connected to the cable member 14, for controlling the rotation of the restraint portion 30, may be formed in various shapes without departing from technical spirits which allow or restrain the rotation of the restraint portion 30.

The locking portion 40 according to various embodiments of the present invention includes a locking body 42, a connection member 44, and a catching boss 46.

The locking body 42 forming a body of the locking portion 40 has a plate shape to be rotatably mounted to the mounting panel 50.

The cable member 14 is connected to the connection member 44 extending from the locking body 42, and the catching boss 46 protrudes toward the restraint portion 30 having the first boss 32 and the second boss 34.

The catching boss 46 is caught by the first boss 32 or the second boss 34 of the restraint portion 30 to restrain the rotation of the restraint portion 30.

Since a fourth connection shaft 153 is installed in the mounting panel 50 to pass through the locking body 42, the locking body 42 is installed to be rotatable about the fourth connection shaft 153.

A fourth spring 154 having a coil spring shape is installed at the outside of the fourth connection shaft 153. One side of the fourth spring 154 is fixed to the mounting panel 50, and the other side of the fourth spring 154 is connected to the locking body 42.

The locking body 42 is rotated by a resilient force of the fourth spring 154 in a counterclockwise direction (with reference to FIG. 6), and is restrained from being rotated by contacting the restraint body 31 for restraining the movement of the striker 12.

The restraint portion 30 and the locking portion 40 are rotatably mounted at a rear side (with reference to FIG. 3) of the mounting panel 50, and the base panel 60 is located at a front side of the mounting panel 50.

The guide recess 52 into which the striker 12 is inserted between the restraint portion 30 and the locking portion 40 is provided at an upper side of the mounting panel 50.

The striker 12 falls down along the guide recess 52 forming a recess in a longitudinal direction of the mounting panel 50 so that movement of the striker 12 is restrained.

A cover panel 55 is fixed to the mounting panel 50 while enclosing the locking portion 40 and the restraint portion 30, in a state where the locking portion 40 and the restraint portion 30 are installed in the mounting panel 50.

The base panel 60 is installed at a front side of the mounting panel 50, and the lever member 90 and a power transmission member 100 are rotatably installed at a front side of the base panel 60.

Further, since a second connection shaft 147 is installed to pass through the base panel 60, the mounting panel 50 of the latch 20, and the cover panel 55, the latch 20 can be rotated about the second connection shaft 147.

When the latch 20 grasping the striker 12 is rotated by an operation of the driving part 110, a guide part 70 for guiding the rotational movement of the latch 20 is provided.

The guide part 70 according to various embodiments of the present invention includes a guide pin 72 fixed to the mounting panel 50 and protruding toward the outside of the case part 120, and the guide hole 74 forming a hole at the case part 120 along movement path of the guide pin 72.

One side of the guide pin 72 is fixed to the mounting panel 50, and the other side of the guide pin 72 protrudes toward the outside of the base panel 60 to be caught by a front side of the base panel 60.

Since the movement path of the guide pin 72 has a circular arc shape of which the center is the second connection shaft 147, the guide hole 74 has a circular arc shape and forms a slot at the case part 120.

When the latch 20 is rotated, the guide pin 72 fixed to the latch 20 is also moved along the guide hole 74 so that a rotational operation of the latch 20 can be stably performed.

When the driving part 110 is not operated, the locking part 80 for restraining the movement of the guide pin 72 is rotatably installed in the base panel 60, and releases the restraint of the guide pin 72 in conjunction with rotation of the lever member 90.

The locking part 80 according to various embodiments of the present invention is rotatably installed on the movement path of the guide pin 72, and includes a locking body 82 rotated by the movement of the lever member 90, a locking connection shaft 86 passing through the locking body 82 to be connected to the base panel 60, and a locking spring 88 wound on the outside of the locking connection shaft 86 and pressing a locking boss 84 extending from the locking body 82 to dispose the locking body 82 on the movement path of the guide pin 72.

The locking body 82 is rotatably installed in the base panel 60, and the locking boss 84 protrudes toward one side of the locking body 82. The locking body 82 includes a first inclined surface 82a and a second inclined surface 82c, and the position of the second inclined surface 82c is fixed in a state of contacting a lever body 92.

Thus, rotation of the locking part 80 is restrained by the lever member 90.

The locking connection shaft 86 is installed in the base panel 60 to pass through the locking body 82.

Since one side of the locking spring 88 wound on the outside of the locking connection shaft 86 is connected to the locking boss 84 and the other side of the locking spring 88 is connected to the base panel 60, the locking part 80 receives a resilient force to be rotated in a clockwise direction.

In a state in which a side surface of the locking body 82 is in contact with an end of the lever body 92 to restrain the rotation of the locking body 82, an end of the locking body 82 is in contact with the guide pin 72 to restrain the guide pin 72 from being moved along the guide hole 74.

Since the lever member 90 is rotated separately with the latch 20 and the striker 12 is located in the rotation path of the lever member 90, the present invention can be modified in various forms without departing from technical sprits that pushes the striker 12 upward by the rotation of the lever member 90

The lever member 90 rotatably installed at a front side of the base panel 60 together with the locking part 80 includes the lever body 92 and a lever boss 94.

Since the second connection shaft 147 is installed to pass through the lever body 92 forming a body of the lever member 90, the base panel 60, and the latch 20 in sequence, the lever member 90 is rotatably installed in the base panel 60.

One side of a second spring 148 wound on the outside of the second connection shaft 147 is connected to the lever boss 94 protruding toward the outside of the lever body 92, and the other side of the second spring is caught by the base panel 60. Thus, the lever member 90 is resiliently supported by a resilient fore of the second spring 148 in a clockwise direction (with respect to FIG. 7).

When the lever member 90 pushed and rotated in a counterclockwise direction by the power transmission member 100 is rotated about the second connection shaft 147, an upper surface of the lever member 90 raises a lower side of the striker 12 to move the striker 12 to the outside of the guide hole.

The power transmission member 100 can be modified in various forms without departing from technical sprits that converts linear movement of the driving part 110 into rotational movement to rotate the lever member 90.

The power transmission member 100 according to various embodiments of the present invention includes a power transmission body 102 rotatably installed in the base panel 60, an extension member 104 extending from the power transmission body 102 and facing a rod member 118, and a press boss 106 extending from the power transmission body 102 and facing a side surface of the lever member 90.

Since a first connection shaft 140 passes through the power transmission body 102 to be fixed to a front surface of the base panel 60, the power transmission member 100 is rotated about the first connection shaft 140.

Since a first spring 142 is wound on the outside of the first connection shaft 140, one side of the first spring 142 is caught by the power transmission body 102, and the other side of the first spring 142 is caught by the base panel 60, the power transmission member 100 receives a resilient force to be rotated in a counterclockwise direction (with respect to FIG. 7).

The extension member 104 is curved toward a side direction of the power transmission body 102, and the press boss 106 is installed to be in contact with a side surface of the lever member 90.

As shown in FIGS. 3 and 10, the driving part 110 is installed while being fixed to the case part 120, and various type of driving part can be employed as the driving part 110 without departing from technical sprits that is operated by an external signal to press the power transmission member 100 so as to rotate the lever member 90.

Since the driving part 110 is operated by using an explosion force of gunpowder, and rotates the lever member 90 upward to raise the striker 12 upward, the hood 10 fixed to the striker 12 moves upward.

The driving part 110 is installed in a direction in which the striker 12 is lowered and intersected in order to be restrained at the latch 20. The driving part 110 according to various embodiments of the present invention is installed in a horizontal direction, and the rod member 118 is moved toward a side direction of the driving part 110.

The driving part 110 according to various embodiments of the present invention includes a driving housing 112, an explosion portion 114, a piston 116, the rod member 118, and a melt sealing 119.

The driving housing 112 is installed at a lower side of a second panel 124 of the case part 120 in a horizontal direction, and is fixed to the second panel 124 by a bracket member 126 enclosing the outside of the driving housing 112.

The driving housing 112 has a pipe shape of which one side is opened, and the explosion portion 114 is located within the driving housing 112.

The explosion portion 114 performs explosion by an external signal, a volume of gas generated by the explosion of the explosion portion 114 increases so that the piston 116 and the rod member 118 is moved.

As shown in FIGS. 3, 10, 11 and 15, a sensor 135 for detecting whether a pedestrian contacts a bumper of a vehicle transfers a measured value to a controller 130, and the controller 130 transfers an external signal to the explosion portion 114 of the driving part 110 to explode the explosion portion 114.

The piston 116 is installed inside of the driving housing 112 to be linearly moved, and is moved by the explosion of the explosion portion 114.

The rod member 118 is connected to the piston 116, and is moved in a horizontal direction by the horizontal movement of the piston 116 so as to rotate the power transmission member 100.

Since the rod member 118 presses the extension member 104 of the power transmission member 100 to rotate the power transmission member 100, the lever member 90 is pushed by the power transmission member 100 to be also rotated and the striker 12 restrained to the latch 20 is moved upward.

The melt sealing 119 has a ring shape enclosing the outside of the piston 116, and is melt by high temperature gas generated by the explosion of the explosion portion 114 to form a passage through which the gas is discharged between the driving housing 112 and the piston 116.

To this end, the melting point of the melt sealing 119 is set under a temperature of gas generated by the explosion of the explosion portion 114.

Meanwhile, although it is exemplified that the number of driving part 110 is one, it is regarded simply as exemplary. One will appreciate that even a plurality of driving part 110 may be installed in accordance with the present invention.

The case part 120 has a shape enclosing the latch 20 and the lever member 90, and is fixed to the base panel 60.

The case part 120 according to various embodiments of the present invention includes a first panel 122 enclosing the locking part 80, the power transmission member 100, and the lever member 90 and coupled to a front side of the base panel 60, a second panel 124 enclosing the latch 20 and coupled to a rear side of the base panel 60, and the bracket member 126 for fixing the driving part 110 to the second panel 124.

The second connection shaft 147 is installed to pass through the second spring 148, the lever member 90, the base panel 60, the mounting panel 50, and the cover panel 55 in sequence. Since a cap member 146 passes through the first panel 122 and the second panel 124 to be fixed to the second connection shaft 147 in a state where the first panel 122 and the second panel 124 is located at opposite sides of the second connection shaft 147, components of the active hood latch apparatus 1 for a vehicle are connected to each other.

Hereinafter, an operation state of the active hood latch apparatus 1 for a vehicle will be described in detail with reference to the accompanying drawings.

As shown in FIGS. 6 and 7, when the hood 10 is moved downward, the striker 12 is also moved downward together with the hood 10 to be installed in the latch 20 in a locking state.

When the restraint portion 30 is about to be rotated in a counterclockwise direction (with respect to FIG. 6) in a state where the striker 12 is inserted into the leading-in recess 33, the first boss 32 of the restraint portion 30 is caught by the catching boss 46 so that the rotation of the restraint body 31 can be restrained.

As shown in FIGS. 8, 13, and 15, when a pedestrian collides with a bumper of a vehicle, the sensor 135 for detecting an impact of the bumper transfers the measured value to the controller 130.

The controller 130 transfers a control signal to the explosion portion 114 of the driving part 110, and the explosion portion 114 is operated by the control signal which is an external signal and is exploded inside of the driving housing 112.

The internal pressure of the driving housing 112 increases due to a gas generated by the explosion of the explosion portion 114. Accordingly, the rod member 118 is moved in a horizontal direction to rotate the power transmission member 110.

When the lever member 90 is rotated in a counterclockwise direction while the power transmission member 100 rotates, the lever member 90 pushes the striker 12 upward to be rotated.

The latch 20 restraining the striker 12 protrudes toward an upper side of the case part 120 while rotating about a second rotary shaft.

Since the hood 10 connected to an upper side of the striker 12 is also moved upward, a shock absorption space is formed between the engine room and the hood 10, thereby reducing a secondary impact of a pedestrian.

When the lever member 90 pushes the locking part 80 in a counterclockwise direction while rotating, the restraint of the guide pin 72 is released.

Thus, the guide pin 72 fixed to the latch 20 is moved along the guide hole 74 in conjunction with an operation in which the latch 20 is rotated about the second connection shaft 147.

As shown in FIGS. 13 and 14, when high temperature gas is filled inside of the driving housing 112, the melt sealing 119 formed of a material melted at high temperature contacts the gas and is melted. Thus, the gas filled in the driving housing 112 can be moved toward the outside of the driving part 110 through the melt sealing 119.

Thus, when a pedestrian's body collides with the hood 10, an external force is transferred to the driving part 110 through the striker 12, the lever member 90, and the power transmission member 100.

When the external force is transferred to the driving part 110, the rod member 118 is moved toward the inside of the driving housing 112 while a part of gas in the driving housing 112 escapes toward the outside of the driving part 110. Thus, the mounting panel 50, the hood 10, and the striker 12 are also moved downward so as to absorb impacts.

As described above, in accordance with the present invention, when a vehicle collides with a pedestrian, the mounting panel 50 including the latch 20 is moved upward by using the explosion of the driving part 110 to raise the striker 12. Thus, the shock absorption space is provided between the hood 10 and the engine room, thereby reducing a secondary impact of a pedestrian.

Further, the meal sealing 119 is melted by high temperature gas in a state where the hood 10 is moved upward by unfolding of the rod member 118 so that the gas can be moved toward the outside of the piston 116. Accordingly, when a pedestrian contacts the hood 10, the hood 10 is moved downward, thereby reducing a secondary impact of the pedestrian.

Hereinafter, an operational state of the active hood latch apparatus 1 for a vehicle after collision with a pedestrian according to various embodiments of the present invention will be described in detail with reference to the accompanying drawings.

As shown in FIGS. 10 to 12, when the rod member 118 protrudes toward the outside of the driving housing 112 by the explosion of the explosion portion 114 and then a predetermined time period passes, the gas in the driving housing 112 completely escapes to the outside so that the rod member 118 returns to the inside of the driving housing 112 again.

The power transmission member 100 is rotated in a counterclockwise direction according to the return of the rod member 118, the lever member 90 supported by the power transmission member 100 is rotated in a clockwise direction. Accordingly, a pressurization force of the lever member 90 applied to the striker 12 is released so that the striker 12 is moved downward.

At this time, the lever body 92 is supported by the locking body 82 so that the clockwise rotation of the lever member 90 is stopped.

That is, the lever body 92 which has been rotated in a clockwise direction stops rotating while contacting the first inclined surface 82a of the locking body 82. This is because a rotational force of the lever body 92 is smaller than a resilient support force of the locking body 82.

Thereafter, when a driver pressurizes the hood 10 downward, the striker 12 is moved downward by a provided external force so as to pressurize the lever body 92 downward.

At this time, when a pressurization force applied to the lever body 92 is larger than a resilient support force of the locking body 82, the lever body 92 goes through an edge portion 82b of the locking body 82 and is further rotated in a clockwise direction.

The striker 12 can be moved downward by the clockwise directional rotation of the lever body 92, and the guide pin 72 is further moved downward along the guide hole 72 at the same time.

At this time, the locking body 82 pushed rearward by the lever body 92 returns to its original place so that the guide pin 72 is restrained from being moved and the lever body 92 contacts the second inclined surface 82c of the locking body 82.

As described above, in accordance with the present invention, when a driver make a vehicle to move to a wanted place after the collision with a pedestrian, the hood 10 temporarily closed as shown in FIG. 10 can be changed to a completely-closed state as shown in FIG. 12.

The vehicle can be moved by direct driving of the driver or towing of a tow truck. In a state shown in FIG. 10, since the counterclockwise directional rotation of the lever member 90 cannot be restrained, the striker 12 has no chance but to be moved upward and to be moved downward to its original place according to the counterclockwise directional rotation and return to its original place of the lever member 90.

At this time, the striker 12 has no chance but to collide with the lever member 90, so as to generate noise and vibration when the vehicle is moved. Further, since the hood 10 is not completely closed, various foreign substances may be introduced through a gap of the hood 10.

At this time, when a driver pressurizes the hood downward, the hood is completely closed so that noise, vibration, and safety problems caused when the vehicle is moved can be solved, and the foreign substances can be basically prevented from being introduced into the vehicle.

For convenience in explanation and accurate definition in the appended claims, the terms upper, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents. following attached claims.

What is claimed is:

1. An active hood latch apparatus for a vehicle, the apparatus comprising:
    a latch for locking or unlocking a striker connected to a hood;
    a base panel installed such that the latch can be rotated relative to the base panel;
    a lever member rotatably installed on the base panel, the striker, when locked by the latch and in a lowered position being located in a rotational path thereof;
    a locking part rotatably installed on the base panel to restrain movement of a guide pin and the lever member by engagement with the lever member, and to release the restraint of the guide pin and the lever member in conjunction with a rotation of the lever member in a first direction, the locking part having a locking body rotatably installed in a movement path of the guide pin and is rotated by a rotation of the lever member in a second direction; and
    a driving part rotating the lever member in the first direction by a force larger than a restraint force of the locking part to restrain movement of the guide pin and the lever member such that the rotation of the lever member overcomes the restraint force causing the locking part to rotate and release the guide pin, wherein after rotating the lever member in the first direction, the driving part supplies power to raise the striker to a raised position, and then absorbs an impact;
    wherein the lever member is rotated in the second direction by movement of the striker back to the lowered position from the raised position such that the locking part is rotated by the lever member so as to biased back into engagement with the lever member.

2. The apparatus of claim 1, further comprising a power transmission member for transmitting power of the driving part to the lever member.

3. The apparatus of claim 1, wherein the latch comprises:
    a restraint portion for restraining movement of the striker;
    a locking portion connected to a cable member, for controlling rotation of the restraint portion; and
    a mounting panel to which the restraint portion and the locking portion are rotatably mounted, with the mounting panel having a guide recess into which the striker is inserted between the restraint portion and the locking portion.

4. The apparatus of claim 3, wherein the driving part comprises:
    a driving housing fixed to a case part, a side of the driving housing being open;
    an explosion portion located inside the driving housing and exploded by an external signal;
    a piston installed inside the driving housing to be linearly moved by the explosion of the explosion portion; and
    a rod member connected to the piston for pressing a power transmission member by movement of the piston.

5. The apparatus of claim 4, wherein the driving housing is cylindrical in shape, enclosing the outside of the piston and further comprises a melt sealing melted by gas generated by the explosion of the explosion portion to allow the gas to be discharged between the driving housing and the piston.

6. The apparatus of claim 4, wherein the power transmission member comprises:
    a power transmission body rotatably installed on the base panel;
    an extension member extending from the power transmission body and facing the rod member; and a press boss extending from the power transmission body and facing a side surface of the lever member.

7. The apparatus of claim 1, wherein the locking part further comprises:
   a locking connection shaft passing through the locking body and connected to the base panel; and
   a locking spring wound on an outside of the locking connection shaft, for disposing the locking body in the movement path of the guide pin through pressing a locking boss extending from the locking body by a resilient force.

* * * * *